United States Patent
Kawamura et al.

(10) Patent No.: US 10,065,625 B2
(45) Date of Patent: Sep. 4, 2018

(54) CONTROL APPARATUS AND CONTROL METHOD FOR HYBRID VEHICLE

(71) Applicant: TOYOTA JIDOSHA KABUSHIKI KAISHA, Toyota-shi, Aichi-ken (JP)

(72) Inventors: Akihiro Kawamura, Nagoya (JP); Shinji Matsuo, Miyoshi (JP); Chikara Inoue, Chiryu (JP); Yukinori Ohta, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 58 days.

(21) Appl. No.: 15/200,927

(22) Filed: Jul. 1, 2016

(65) Prior Publication Data
US 2017/0009684 A1 Jan. 12, 2017

(30) Foreign Application Priority Data
Jul. 6, 2015 (JP) .................... 2015-135046

(51) Int. Cl.
| | |
|---|---|
| *B60L 9/00* | (2006.01) |
| *B60L 11/00* | (2006.01) |
| *G05D 1/00* | (2006.01) |
| *G05D 3/00* | (2006.01) |
| *G06F 7/00* | (2006.01) |
| *G06F 17/00* | (2006.01) |
| *B60W 10/06* | (2006.01) |
| *B60W 20/00* | (2016.01) |
| *F02N 11/08* | (2006.01) |

(52) U.S. Cl.
CPC ............ *B60W 10/06* (2013.01); *B60W 20/00* (2013.01); *F02N 11/0829* (2013.01); *B60W 2510/06* (2013.01); *B60W 2710/06* (2013.01); *F02D 2250/11* (2013.01); *Y02T 10/48* (2013.01)

(58) Field of Classification Search
None
See application file for complete search history.

(56) References Cited

U.S. PATENT DOCUMENTS

| | | | |
|---|---|---|---|
| 2012/0109498 A1 | 5/2012 | Murase | |
| 2014/0058647 A1* | 2/2014 | Haladyna ................. | B60K 6/48 |
| | | | 701/104 |

FOREIGN PATENT DOCUMENTS

| | | |
|---|---|---|
| JP | H10-317936 A | 12/1998 |
| JP | 2004-316471 A | 11/2004 |
| JP | 2006-046245 A | 2/2006 |
| JP | 2008-121621 A | 5/2008 |
| JP | 2011-012628 A | 1/2011 |

(Continued)

OTHER PUBLICATIONS

Machine Translation KP-2011122543 published Jun. 2011.*

*Primary Examiner* — Anne M Antonucci
*Assistant Examiner* — Kenny A. Taveras
(74) *Attorney, Agent, or Firm* — Oliff PLC

(57) ABSTRACT

An ECU is applied to a hybrid vehicle that is equipped with an internal combustion engine and a second motor-generator, which are configured to output a driving force for running. The hybrid vehicle is configured to run with the internal combustion engine in intermittent operation. Also, the ECU is configured to calculate an amount of dilution water that is mixed into oil in the internal combustion engine to dilute the oil. The ECU is configured to operate the internal combustion engine when the amount of the dilution water becomes larger than a first threshold.

5 Claims, 5 Drawing Sheets

(56) References Cited

FOREIGN PATENT DOCUMENTS

| JP | 2011-106362 A | | 6/2011 |
|----|---------------|---|--------|
| JP | 2011-122543 A | | 6/2011 |
| JP | 2011122543 A | * | 6/2011 |
| JP | 2015-044477 A | | 3/2015 |

* cited by examiner

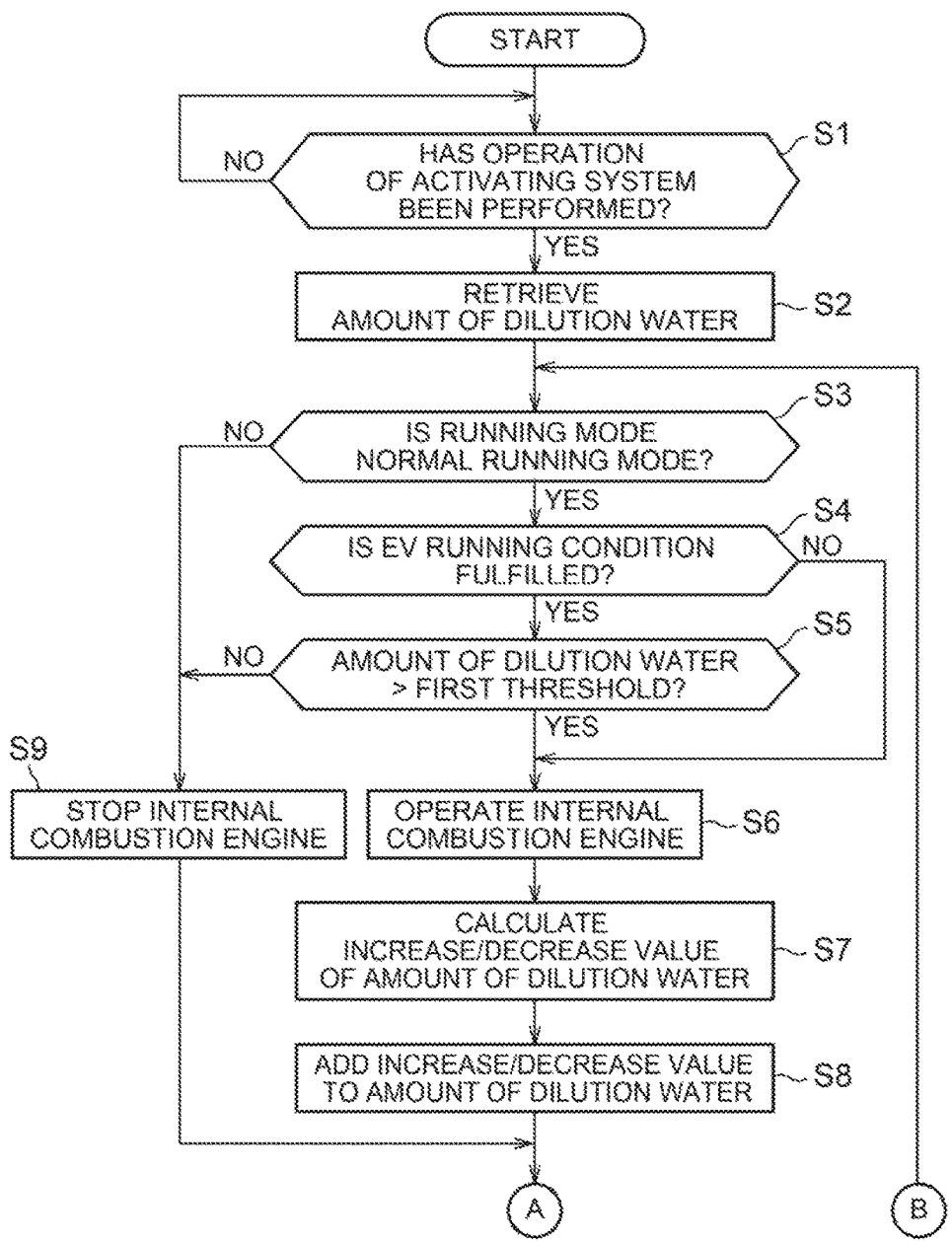

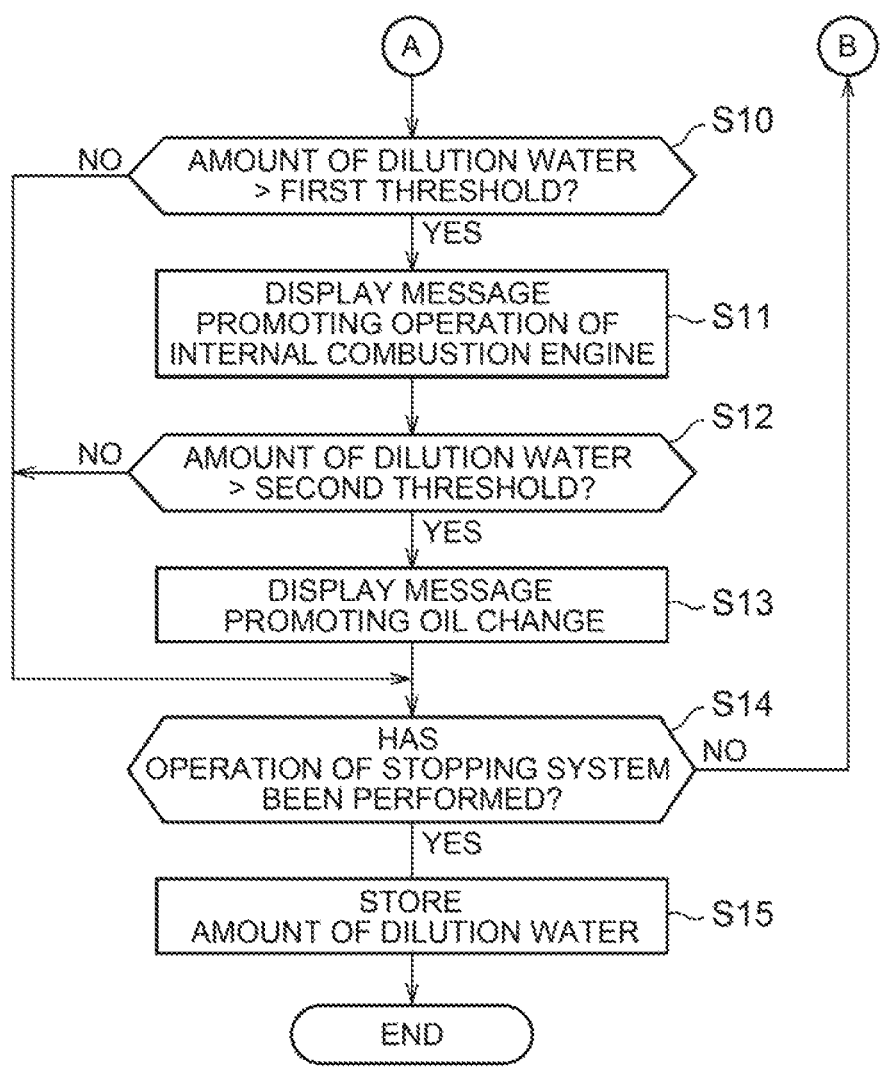

CONTROL APPARATUS AND CONTROL METHOD FOR HYBRID VEHICLE

INCORPORATION BY REFERENCE

The disclosure of Japanese Patent Application No. 2015-135046 filed on Jul. 6, 2015 including the specification, drawings and abstract is incorporated herein by reference in its entirety.

BACKGROUND

1. Technical Field

The present disclosure relates to a control apparatus for a hybrid vehicle.

2. Description of Related Art

Japanese Patent Application Publication No. 2015-044477 (JP 2015-044477 A) discloses a hybrid vehicle that is equipped with an internal combustion engine configured to output a driving force for running and a motor configured to output a driving force for running, and that is configured to run with the internal combustion engine in intermittent operation.

In this hybrid vehicle, so-called EV running is possible. That is, the hybrid vehicle can run by a driving force from the motor, with the internal combustion engine stopped from being supplied with fuel. In the case where EV running is frequently used, the internal combustion engine is unlikely to be warmed up. In the internal combustion engine, the amount of dilution water that is mixed into oil (engine oil) may increase or decrease depending on the operation state. For example, when the internal combustion engine is started in a cold state, the water contained in blow-by gas is likely to be liquefied, and the amount of condensed water in oil is likely to increase. On the other hand, after the internal combustion engine is warmed up, the water in oil is evaporated, so the amount of condensed water in oil is likely to decrease.

SUMMARY

In the aforementioned hybrid vehicle, for example, when the internal combustion engine that has not been warmed up is repeatedly started and stopped, the amount of condensed water in oil may become large. Then, in the case where the outside air temperature becomes low when the hybrid vehicle is stopped in a cold district or the like, the condensed water in oil may freeze to produce blocks of ice. In such a case, when the internal combustion engine is started, the blocks of ice clog up an oil passage, so insufficient lubrication may be caused.

A control apparatus for a hybrid vehicle that can restrain the amount of condensed water in oil from becoming large is provided.

According to one aspect of the disclosure, a control apparatus for a hybrid vehicle is provided. The hybrid vehicle includes an internal combustion engine and a motor. The internal combustion engine is configured to output a driving force for running. The motor is configured to output a driving force for running. The hybrid vehicle is configured to run with the internal combustion engine in intermittent operation. The control apparatus includes an electronic control unit. The electronic control unit configured to: calculate an amount of dilution water; and operate the internal combustion engine when the amount of the dilution water becomes larger than a first threshold. The dilution water is water that is mixed into oil in the internal combustion engine to dilute the oil.

Due to this configuration, the internal combustion engine is operated when the amount of dilution water becomes larger than the first threshold. Thus, when the operation of the internal combustion engine is continued, the internal combustion engine is warmed up, and the condensed water in oil becomes likely to evaporate. Therefore, the amount of condensed water in oil can be restrained from becoming large.

According to the above mentioned aspect, the electronic control unit may be configured to output a signal to prompt a driver to change the oil when the amount of the dilution water becomes larger than a second threshold. The second threshold may be larger than the first threshold.

According to the above mentioned aspect, the large amount of condensed water in oil can be swept out when oil is changed.

According to the above mentioned aspect, the electronic control unit may be configured to output a signal to prompt a driver to continue to operate the internal combustion engine when the internal combustion engine is in operation in a case where the amount of the dilution water becomes larger than the first threshold.

According to the above mentioned aspect, the internal combustion engine can be restrained from being stopped by the driver when the internal combustion engine is in operation to evaporate the condensed water in oil.

According to the above mentioned aspect, the electronic control unit may be configured to store the amount of the dilution water, and reset the amount of the dilution water stored in the electronic control unit when the oil is changed.

According to the above mentioned aspect, the amount of dilution water can be appropriately calculated even in the case where oil is changed.

According to another aspect of the disclosure, a control method for a hybrid vehicle includes an internal combustion engine, a motor, and an electronic control unit. The internal combustion engine is configured to output a driving force for running. The motor is configured to output a driving force for running. The hybrid vehicle is configured to run with the internal combustion engine in intermittent operation. The control method including: calculating an amount of dilution water by the electronic control unit; and operating the internal combustion engine by the electronic control unit, when the amount of the dilution water becomes larger than a first threshold. The dilution water is water that is mixed into oil in the internal combustion engine to dilute the oil.

The control apparatus for the hybrid vehicle of the disclosure restrains the amount of condensed water in oil from becoming large.

BRIEF DESCRIPTION OF THE DRAWINGS

Features, advantages, and technical and industrial significance of an exemplary embodiment will be described below with reference to the accompanying drawings, in which like numerals denote like elements, and wherein:

FIG. 4 is a flowchart showing an exemplary operation in the hybrid vehicle of the present embodiment; and FIG. 5 is a flowchart showing the exemplary operation in the hybrid vehicle of the present embodiment.

DETAILED DESCRIPTION OF EMBODIMENT

The embodiment will be described hereinafter based on the drawings. In the present embodiment of the disclosure, a case where a hybrid vehicle is controlled by an electronic control unit (hereinafter referred to also as an ECU) will be described.

First of all, a mechanical configuration (a drive system) of a hybrid vehicle 100 that is equipped with an ECU 71 according to the embodiment of the disclosure will be described with reference to FIG. 1.

Figure 1:
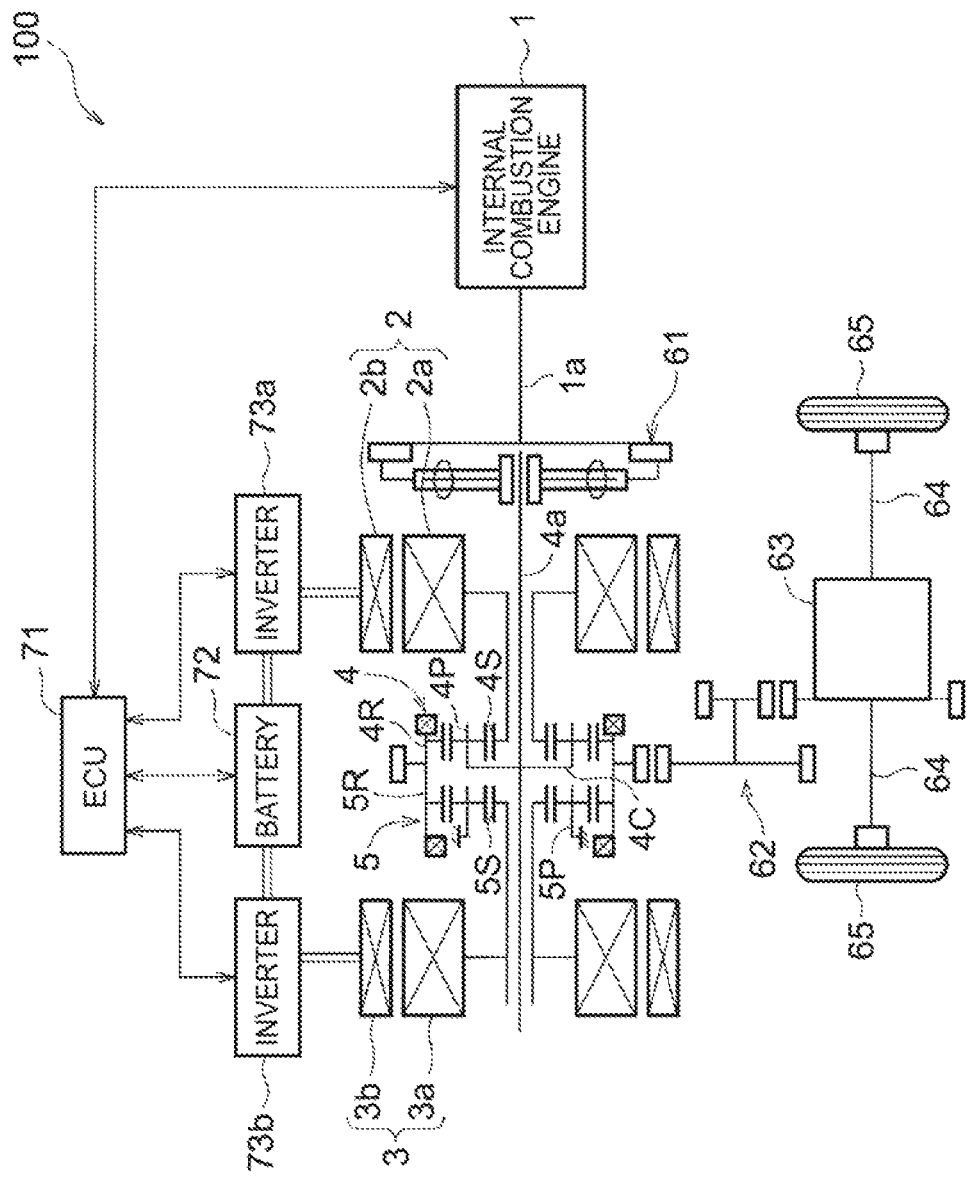
FIG. 1 is a schematic configuration view for illustrating a hybrid vehicle that is equipped with an ECU according to the embodiment.

As shown in FIG. 1, the hybrid vehicle 100 is equipped with an internal combustion engine 1, a first motor-generator 2, a second motor-generator 3, a motive power split mechanism 4, and a reduction mechanism 5.

An output of the internal combustion engine 1 is transmitted to an input shaft 4a of the motive power split mechanism 4 via a crankshaft 1a and a damper 61. The damper 61 has the function of absorbing fluctuations in the torque of the internal combustion engine 1. Incidentally, the details of the internal combustion engine 1 will be described later.

The first motor-generator 2 mainly functions as a generator, and functions as an electric motor as well depending on circumstances. The first motor-generator 2 is, for example, an alternating-current synchronous generator, and has a rotor 2a and a stator 2b. The rotor 2a is formed of a permanent magnet that is rotatably supported with respect to the input shaft 4a. A three-phase winding is wound around the stator 2b. Incidentally, the first motor-generator 2 functions as a starter motor as well when the internal combustion engine 1 is started.

The second motor-generator 3 mainly functions as an electric motor, and functions as a generator as well depending on circumstances. The second motor-generator 3 is, for example, an alternating-current synchronous electric motor, and has a rotor 3a and a stator 3b. The rotor 3a is formed of a permanent magnet that is rotatably supported with respect to the input shaft 4a. A three-phase winding is wound around the stator 3b.

The motive power split mechanism 4 is, for example, a planetary gear mechanism, and is configured to split the output of the internal combustion engine 1 into a motive power for driving wheels 65 and a motive power for driving the first motor-generator 2 to generate electric power.

In concrete terms, the motive power split mechanism 4 has a sun gear 4S, a pinion gear 4P, a ring gear 4R and a planetary carrier 4C. The sun gear 4S is an external gear that rotates around its own axis at the center of a plurality of gear elements. The pinion gear 4P is an external gear that rotates around its own axis and around the sun gear 4S while being circumscribed on (meshing with) the sun gear 4S. The ring gear 4R is an internal gear that is formed in the shape of a hollow ring in such a manner as to mesh with the pinion gear 4P. The planetary carrier 4C supports the pinion gear 4P, and rotates around its own axis through the rotation of this pinion gear 4P.

The planetary carrier 4C is coupled to the input shaft 4a in such a manner as to rotate integrally therewith. The sun gear 4S is coupled to the rotor 2a of the first motor-generator 2 in such a manner as to rotate integrally therewith. A motive power of the ring gear 4R is transmitted to the driving wheels 65 via a deceleration device 62, a differential device 63 and a drive shaft 64.

The reduction mechanism 5 is, for example, a planetary gear mechanism, and is configured to decelerate the rotation of the second motor-generator 3 and amplify the driving torque.

In concrete terms, the reduction mechanism 5 has a sun gear 5S, a pinion gear 5P and a ring gear 5R. The sun gear 5S is an external gear that rotates around its own axis at the center of a plurality of gear elements. The pinion gear 5P is an external gear that rotates around its own axis while being circumscribed on the sun gear 5S. The ring gear 5R is an internal gear that is formed in the shape of a hollow ring in such a manner as to mesh with the pinion gear 5P.

The ring gear 5R of the reduction mechanism 5 and the ring gear 4R of the motive power split mechanism 4 are integrated with each other. The sun gear 5S is coupled to the rotor 3a of the second motor-generator 3 in such a manner as to rotate integrally therewith. The pinion gear 5P is rotatably supported by a case.

Next, the schematic configuration of the internal combustion engine 1 that is mounted in the hybrid vehicle 100 will be described with reference to FIG. 2.

Figure 2:
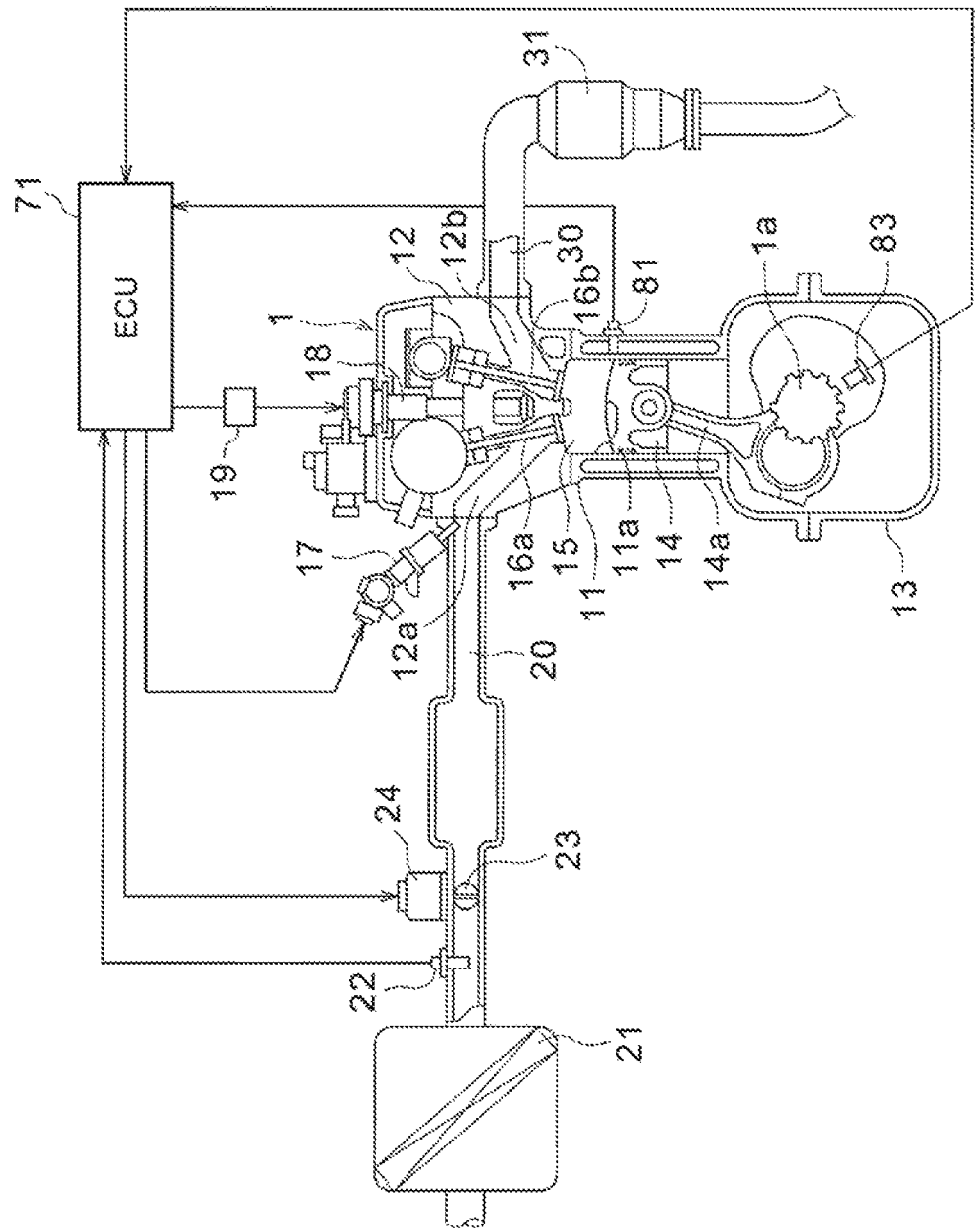
FIG. 2 is a schematic configuration view showing an internal combustion engine that is mounted in the hybrid vehicle of FIG. 1.

As shown in FIG. 2, the internal combustion engine 1 is equipped with a cylinder block 11, a cylinder head 12 that is provided at an upper portion of the cylinder block 11, and an oil pan 13 that is provided at a lower portion of the cylinder block 11.

This internal combustion engine 1 is, for example, a port injection-type in-line four-cylinder engine. Incidentally, FIG. 2 shows only one of four cylinders.

A cylinder bore 11a is formed in the cylinder block 11. A piston 14 is provided in the cylinder bore 11a in a reciprocable manner. The crankshaft 1a as an output shaft is coupled to the piston 14 via a connecting rod 14a. The connecting rod 14a has the function of converting reciprocating motions of the piston 14 into rotating motions of the crankshaft 1a.

A combustion chamber 15 is formed between the piston 14 in the cylinder bore 11a and the cylinder head 12. An intake port 12a and an exhaust port 12b, which communicate with the combustion chamber 15, are formed in the cylinder head 12. An intake passage 20 is connected to the intake port 12a, and an exhaust passage 30 is connected to the exhaust port 12b.

An air cleaner 21 that filters intake air, an airflow meter 22 that detects an amount of intake air, a throttle valve 23 for adjusting the amount of intake air, and the like are arranged in the intake passage 20. The throttle valve 23 is driven by a throttle motor 24. A three-way catalyst 31 for purifying noxious substances in exhaust gas, and the like are arranged in the exhaust passage 30.

Besides, the cylinder head 12 is provided with an intake valve 16a that opens/closes the intake port 12a, and an exhaust valve 16b that opens/closes the exhaust port 12b. The intake valve 16a is provided to establish or block communication between the combustion chamber 15 and the intake passage 20. The exhaust valve 16b is provided to establish or block communication between the combustion chamber 15 and the exhaust passage 30.

An injector (a fuel injection valve) 17 configured to inject fuel is provided in the vicinity of the intake port 12a. Besides, an ignition plug 18 is provided such that a tip thereof faces the combustion chamber 15. The ignition timing of this ignition plug 18 is adjusted by an igniter 19.

Then, fuel is supplied to the injector 17 from a fuel tank (not shown), and is injected to the intake port 12*a* from the injector 17. This injected fuel is mixed with intake air to become an air-fuel mixture, which is introduced into the combustion chamber 15 of the internal combustion engine 1. The air-fuel mixture (fuel +air) introduced into the combustion chamber 15 is ignited by the ignition plug 18 to burn and explode. The piston 14 is caused to move in a reciprocating manner by the combustion gas produced at this time. Thus, the crankshaft 1*a* is rotated, and a driving force (an output torque) of the engine 1 is obtained.

Oil (engine oil) for lubricating the internal combustion engine 1, cooling the internal combustion engine 1, etc. is stored in the oil pan 13. The oil stored in the oil pan 13 is supplied to respective components of the internal combustion engine 1 by an oil pump (not shown), and then is returned to the oil pan 13.

Next, the electric configuration (a control system) of the hybrid vehicle 100 will be described with reference to FIG. 3.

Figure 3:
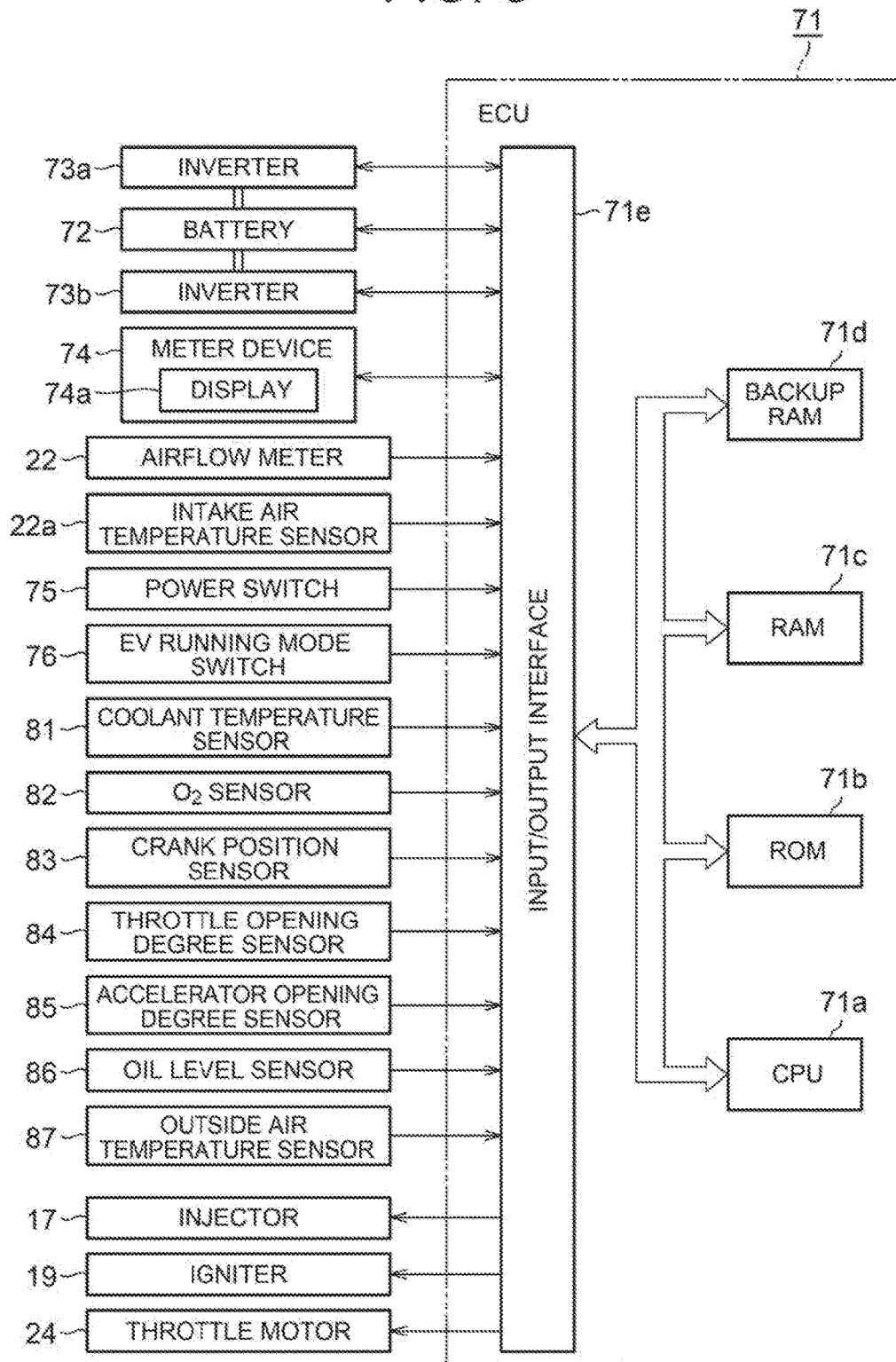
FIG. 3 is a block diagram showing an electric configuration of the hybrid vehicle of FIG. 1.

As shown in FIG. 3, the hybrid vehicle 100 is equipped with an ECU 71, a battery 72, inverters 73*a* and 73*b*, a meter device 74, a power switch 75, and an EV running mode switch 76.

The ECU 71 is configured to activate a hybrid system (a vehicle system) and control the running of the hybrid vehicle 100. In concrete terms, the ECU 71 performs various kinds of control including operation control of the internal combustion engine 1, drive control of the first motor-generator 2 and the second motor-generator 3, cooperation control of the internal combustion engine 1, the first motor-generator 2 and the second motor-generator 3, and the like.

This ECU 71 includes a CPU 71*a*, a ROM 71*b*, a RAM 71*c*, a backup RAM 71*d* and an input/output interface 71*e*, which are connected to one another via a bus.

The CPU 71*a* executes a computation process based on various control programs and maps stored in the ROM 71*b*. The various control programs, the maps that are referred to when the various control programs are executed, and the like are stored in the ROM 71*b*. The RAM 71*c* is a memory that temporarily stores a computation result obtained by the CPU 71*a*, detection results of respective sensors, and the like. The backup RAM 71*d* is a nonvolatile memory that stores data to be saved in stopping the hybrid system, and the like.

The input/output interface 71*e*, to which the detection results of the respective sensors and the like are input, has the function of outputting control signals and the like to the respective components. A coolant temperature sensor 81, the airflow meter 22, an intake air temperature sensor 22*a*, an O$_2$ sensor 82, a crank position sensor 83, a throttle opening degree sensor 84, an accelerator opening degree sensor 85, an oil level sensor 86, an outside air temperature sensor 87 and the like are connected to the input/output interface 71*e*.

The coolant temperature sensor 81 is provided to detect a coolant temperature of the engine. The intake air temperature sensor 22*a* is built in the airflow meter 22, and is provided to detect a temperature of intake air. The O$_2$ sensor 82 is provided to detect a concentration of oxygen in exhaust gas. The crank position sensor 83 is provided to calculate a rotational speed of the internal combustion engine 1 (an engine rotational speed) per unit time. The throttle opening degree sensor 84 is provided to detect an opening degree of the throttle valve 23. The accelerator opening degree sensor 85 is provided to detect an operation amount (a depression amount) of an accelerator pedal. The oil level sensor 86 is provided to detect an oil level (a height of an oil surface) in the oil pan 13. The outside air temperature sensor 87 is provided to detect an outside air temperature (a temperature of the outside of a vehicle interior).

Besides, the injector 17, the igniter 19 and the throttle motor 24 are connected to the input/output interface 71*e*. Then, the ECU 71 is configured to be able to control the operation state of the internal combustion engine 1 by controlling the amount of fuel injection, the timing of ignition, the opening degree of the throttle valve (the amount of intake air) and the like, based on the detection results of the respective sensors and the like.

Besides, the battery 72, the inverters 73*a* and 73*b*, the meter device 74, the power switch 75 and the EV running mode switch 76 are connected to the input/output interface 71*e*.

The battery 72 is a rechargeable high-voltage electric power supply, and is configured to supply an electric power for driving the first motor-generator 2 and the second motor-generator 3, and to accumulate an electric power generated by the first motor-generator 2 and the second motor-generator 3.

Each of the inverters 73*a* and 73*b* is, for example, a three-phase bridge circuit having an IGBT and a diode. The on/off state of the IGBT is controlled in accordance with a drive signal that is supplied from the ECU 71. Thus, a motor is so controlled as to perform regenerative operation or power running operation.

The inverter 73*a* performs electric power generation control for converting an alternating current generated by the first motor-generator 2 into a direct current through the motive power of the internal combustion engine 1 and outputting the direct-current to the battery 72, and performs power running control for converting the direct current that is supplied from the battery 72 into an alternating current and driving the first motor-generator 2.

The inverter 73*b* performs power running control for converting a direct current that is supplied from the battery 72 into an alternating current and driving the second motor-generator 3, and performs electric power generation control for converting an alternating current generated by the second motor-generator 3 at the time of regenerative braking into a direct current and outputting the direct current to the battery 72.

The meter device 74 includes a display 74*a* that displays various pieces of information, and the like. The power switch 75 is provided to activate and stop the hybrid system. The EV running mode switch 76 is provided to allow a driver to change over the running mode of the hybrid vehicle 100. Also, the EV running mode switch 76 can make a changeover between, for example, a normal running mode and an EV running mode. Upon being operated by the driver, each of the power switch 75 and the EV running mode switch 76 outputs a signal corresponding to the operation to the ECU 71.

Next, an example of the running state of the hybrid vehicle 100 will be described.

For example, in the case where the normal running mode is applied, the hybrid vehicle 100 stops the operation of the internal combustion engine 1 when starting to move, running at low vehicle speed and at light load and the like, and controls the second motor-generator 3 in such a manner as to perform power running operation, thus performing EV running. The operation of the internal combustion engine 1 is stopped by stopping the supply of fuel to the internal combustion engine 1.

The hybrid vehicle 100 runs with the internal combustion engine 1 serving as a main motive power source, and performs electric power generation control of the first motor-generator 2 at the time of steady running and the like. Then, the hybrid vehicle 100 controls the second motor-generator 3 in such a manner as to perform power running operation as a supplement for the internal combustion engine, with the aid of the electric energy obtained through electric power generation control of the first motor-generator 2.

The hybrid vehicle 100 drives the internal combustion engine 1 at the time of acceleration and the like. Besides, the hybrid vehicle 100 runs while controlling the second motor-generator 3 in such a manner as to perform power running operation with the aid of the electric energy obtained through electric power generation control of the first motor-generator 2 and the electric energy of the battery 72 at the time of acceleration and the like.

The hybrid vehicle 100 applies a braking torque by controlling the second motor-generator 3 in such a manner as to perform regenerative operation, and charges the battery 72 by recovering energy, at the time of deceleration (when the accelerator is off) and the like.

When the driver selects the EV running mode through the use of the EV running mode switch 76 and the hybrid vehicle 100 is capable of performing EV running, the hybrid vehicle 100 stops the operation of the internal combustion engine 1, and controls the second motor-generator 3 in such a manner as to perform power running operation, thus performing EV running. Incidentally, when a predetermined cancellation condition is fulfilled at the time of the EV running mode, a changeover to the normal running mode is automatically made. Besides, as the cancellation condition, it is possible to mention, for example, that the state of charge of the battery 72 is equal to or smaller than a predetermined value, that the vehicle speed is equal to or higher than a predetermined value, that the depression amount of the accelerator pedal is equal to or larger than a predetermined value, and the like. When even one of these conditions is fulfilled, it is determined that the cancellation condition is fulfilled.

That is, the hybrid vehicle 100 is equipped with the internal combustion engine 1 and the second motor-generator 3, which are configured to output a driving force for running, and is configured to be able to intermittently operate the internal combustion engine 1 in accordance with the state of the vehicle (the running mode, the running state, the state of charge of the battery 72 and the like).

It should be noted herein that when EV running is frequently used in the hybrid vehicle 100 configured to perform so-called EV running, the internal combustion engine 1 is unlikely to be warmed up. Besides, in the internal combustion engine 1, the amount of the condensed water that is mixed into oil may increase or decrease depending on the operation state. For example, when the internal combustion engine 1 is started in a cold state, the water contained in blow-by gas is likely to be liquefied, and the amount of condensed water in oil is likely to increase. Meanwhile, after the internal combustion engine 1 is warmed up, the water in oil is evaporated, so the amount of condensed water in oil is likely to decrease.

Then, when the amount of the condensed water in oil becomes large and the outside air temperature becomes low when the vehicle is stopped in a cold district or the like, the condensed water in oil may freeze to produce blocks of ice. In such a case, when the internal combustion engine 1 is started, insufficient lubrication may be caused by the clogging up of an oil passage by the blocks of ice.

Thus, in the hybrid vehicle 100 according to the present embodiment of the disclosure, the warmup of the internal combustion engine 1 is promoted based on the amount of condensed water mixed into oil, and a predetermined message (a warning) is displayed, with a view to restraining the amount of condensed water in oil from becoming large. It should be noted herein that the amount of condensed water means the amount of dilution water for diluting oil.

In concrete terms, the ECU 71 has the amount of dilution water in oil stored in the backup RAM 71d. Then, when the hybrid system is activated, the ECU 71 retrieves the amount of dilution water in oil into the RAM 71c. After that, the ECU 71 calculates an increase/decrease value of the amount of dilution water in accordance with the operation state during the operation of the internal combustion engine 1, and adds the calculated increase/decrease value to the retrieved amount of dilution water. Incidentally, the increase/decrease value of the amount of dilution water is calculated based on, for example, the engine rotational speed, the coolant temperature and the outside air temperature. Then, when the hybrid system is stopped, the ECU 71 stores the amount of dilution water in the RAM 71c into the backup RAM 71d.

Also, the ECU 71 is configured to determine whether or not the amount of condensed water in oil is larger than a first threshold. Incidentally, the first threshold is, for example, a value set in advance, and is a value set based on a permissible limit of an amount of dilution water that can be mixed into oil. Also, the ECU 71 is configured to output a signal to operate the internal combustion engine 1 and output a signal to display a message on the display 74a for prompting the driver to continue to operate the internal combustion engine 1 when the amount of dilution water in oil is larger than the first threshold. Thus, when the operation of the internal combustion engine 1 is continued, the internal combustion engine 1 is warmed up, and the condensed water in oil becomes likely to evaporate. As a result, the amount of condensed water in oil can be restrained from becoming large.

Besides, at the time of the operation of the internal combustion engine 1 for evaporating the condensed water in oil, it is conceivable that the internal combustion engine 1 be stopped by the driver. For example, the internal combustion engine 1 may be stopped as a result of the stop of the hybrid system through the operation of the power switch 75 by the driver, or the internal combustion engine 1 may be stopped as a result of a shift to the EV running mode through the operation of the EV running mode switch 76 by the driver. Therefore, even if the internal combustion engine 1 is operated when the amount of dilution water in oil becomes larger than the first threshold, an operation state where the amount of condensed water decreases may be unlikely to be achieved due to the repetition of an operation state where the amount of condensed water increases, for example, in the case where short-distance running is repeated etc. In such a case, the amount of dilution water in oil is considered to rise above the first threshold.

Thus, the ECU 71 is configured to determine whether or not the amount of dilution water in oil is larger than a second threshold that is larger than the first threshold. Incidentally, the second threshold is, for example, a value set in advance, and is a value set based on the amount of dilution water in the case where condensed water is mixed into oil to such an extent that oil change is required. Also, the ECU 71 is configured to output a signal to cause the display 74a to display a message prompting the driver to change oil when the amount of dilution water in oil is larger than the second threshold.

Furthermore, the ECU 71 is configured to reset the amount of dilution water stored in the backup RAM 71d when oil change is carried out. Incidentally, it is determined whether or not oil change has been carried out, based on, for example, a detection result of the oil level sensor 86.

Incidentally, the ECU 71 constitutes examples of "the calculation means", "the internal combustion engine control means", "the first notification means", "the second notification means" and "the reset means" of the control apparatus. These means are realized through the execution of the programs stored in the ROM 71b by the CPU 71a. Besides, the backup RAM 71d is an example of "the storage means" of the control apparatus.

Next, an example of the control of the operation in the hybrid vehicle 100 of the present embodiment of the disclosure will be described with reference to FIGS. 4 and 5. Incidentally, respective steps are executed by the ECU 71.

First of all, in step S1 of FIG. 4, it is determined, based on a signal input from the power switch 75, whether or not an operation of activating the hybrid system has been performed. Then, if the operation of activating the hybrid system has been performed, a process at the time of activation is executed, and a transition to step S2 is made. Incidentally, if the operation of activating the hybrid system has not been performed, step S1 is repeatedly executed. That is, the ECU 71 stands by until the operation of activating the hybrid system is performed.

Subsequently in step S2, an amount of dilution water in oil stored in the backup RAM 71d is retrieved to the RAM 71c. That is, when the current trip is started, the amount of dilution water originating from the condensed water produced during a previous trip is retrieved.

Subsequently in step S3, it is determined whether or not the running mode is the normal running mode. Then, if the running mode is the normal running mode, a transition to step S4 is made. On the other hand, if the running mode is not the normal running mode, that is, if the running mode is the EV running mode, a transition to step S9 is made.

Subsequently in step S4, it is determined whether or not an EV running condition is fulfilled. Incidentally, it is determined whether or not the EV running condition is fulfilled, based on the running state of the hybrid vehicle 100, the state of charge of the battery 72 and the like. Then, if the EV running condition is fulfilled, a transition to step S5 is made. On the other hand, if the EV running condition is not fulfilled, a transition to step S6 is made.

Subsequently in step S5, it is determined whether or not the amount of dilution water in the RAM 71c is larger than the first threshold. In the case where the internal combustion engine 1 has not been started even once after the activation of the hybrid system, this amount of dilution water in the RAM 71c is equal to the value retrieved in step S2. In the case where the internal combustion engine 1 is operated in step S6, which will be described later, after the activation of the hybrid system, this amount of dilution water in the RAM 71c is equal to a value updated in step S8, which will be described later. Then, if the amount of dilution water in oil is larger than the first threshold, a transition to step S6 is made with a view to reducing the amount of condensed water in oil. On the other hand, if the amount of dilution water in oil is not larger than the first threshold, there is no need to reduce the amount of condensed water in oil, so a transition to step S9 is made.

Then in step S6, the internal combustion engine 1 is operated. For example, when the internal combustion engine 1 is stopped, the internal combustion engine 1 is started. When the internal combustion engine 1 is in operation, the operation of the internal combustion engine 1 is continued. It should be noted herein that the case where the internal combustion engine 1 is in operation means a case where the internal combustion engine 1 has already been started in step S6 preceding the execution of step S14 and a return from step S14 to step S3 is made. The step S14 will be described later. That is, even in the case where the EV running condition is fulfilled at the time of the normal running mode, when the amount of dilution water in oil is larger than the first threshold, the internal combustion engine 1 is operated to thereby promote the warmup of the internal combustion engine 1 and evaporate the condensed water in oil. Incidentally, in the case where the EV running condition is not fulfilled at the time of the normal running mode as well, the internal combustion engine 1 is operated. Besides, at this time, when the hybrid vehicle 100 runs, a driving force is output from the internal combustion engine 1, and a driving force is output from the second motor-generator 3 as well depending on circumstances.

Subsequently in step S7, an increase/decrease value of the amount of dilution water is calculated based on the current operation state of the internal combustion engine 1. This increase/decrease value of the amount of dilution water is calculated using, for example, the engine rotational speed that is calculated based on the detection result of the crank position sensor 83, the coolant temperature as the detection result of the coolant temperature sensor 81, and the outside air temperature as the detection result of the outside air temperature sensor 87. Incidentally, a calculating formula for calculating the increase/decrease value of the amount of dilution water is derived from an experiment conducted in advance.

Subsequently in step S8, the increase/decrease value of the amount of dilution water calculated in step S7 is added to the amount of dilution water in the RAM 71c. That is, the amount of dilution water in the RAM 71c is updated. Thus, changes in the amount of dilution water in oil that increases/decreases in accordance with the operation state of the internal combustion engine 1 can be grasped (traced). After that, a transition to step S10 of FIG. 5 is made.

On the other hand, if the running mode is the EV running mode (No in step S3) and the amount of dilution water in oil is equal to or smaller than the first threshold when the EV running condition is fulfilled in the normal running mode (No in step S5), the internal combustion engine 1 is stopped (the internal combustion engine 1 is stopped from being supplied with fuel) in step S9. For example, when the internal combustion engine 1 is stopped, the state thereof is maintained. When the internal combustion engine 1 is in operation, the internal combustion engine 1 is stopped. Incidentally, at this time, when the hybrid vehicle 100 runs, a driving force is output from the second motor-generator 3. After that, a transition to step S10 of FIG. 5 is made.

Subsequently in step S10 of FIG. 5, it is determined whether or not the amount of dilution water in the RAM 71c is larger than the first threshold. Then, if the amount of dilution water in oil is larger than the first threshold, a transition to step S11 is made. On the other hand, if the amount of dilution water in oil is not larger than the first threshold, a transition to step S14 is made.

Then in step S11, the display 74a of the meter device 74 is caused to display a message (a warning) promoting the operation of the internal combustion engine 1. Thus, the driver can be notified that the internal combustion engine 1 needs to be operated to evaporate condensed water. Then, when the operation of the internal combustion engine 1 is continued, the internal combustion engine 1 is warmed up, and the condensed water in oil becomes likely to evaporate.

Subsequently in step S12, it is determined whether or not the amount of dilution water in the RAM 71c is larger than the second threshold that is larger than the first threshold. Then, if the amount of dilution water in oil is larger than the second threshold, a transition to step S13 is made. On the other hand, if the amount of dilution water in oil is not larger than the second threshold, a transition to step S14 is made.

Then in step S13, the display 74a of the meter device 74 is caused to display a message promoting oil change. Thus, the driver can be notified that oil change is required.

After that, in step S14, it is determined, based on a signal input from the power switch 75, whether or not the operation of stopping the hybrid system has been performed. Then, if the operation of stopping the hybrid system has been performed when the internal combustion engine 1 is in operation, the internal combustion engine 1 is stopped, and a transition to step S15 is made. On the other hand, if the operation of stopping the hybrid system has not been performed, a return to step S3 of FIG. 4 is made. That is, steps S3 to S14 are repeatedly executed until the operation of stopping the hybrid system is performed.

Then in step S15, the amount of dilution water in the RAM 71c is stored into the backup RAM 71d. That is, the amount of dilution water (an integrated value) to the current trip is stored into the backup RAM 71d. After that, other processes at the time of stop are executed, and the series of operations are ended.

In the present embodiment, as described above, the amount of condensed water in oil can be restrained from becoming large by operating the internal combustion engine 1 when the amount of dilution water in oil becomes larger than the first threshold. This is because the internal combustion engine 1 is warmed up and the condensed water in oil becomes likely to evaporate when the operation of the internal combustion engine 1 is continued. That is, the amount of condensed water mixed into oil can be held within a permissible range (equal to or smaller than the first threshold). Thus, even in the case where the outside air temperature has become low when the vehicle is stopped in a cold district or the like, blocks of ice can be restrained from being produced due to the freezing of the condensed water in oil. Accordingly, the blocks of ice can be restrained from clogging up the oil passage, so the occurrence of insufficient lubrication can be suppressed.

Besides, in the present embodiment of the disclosure, in the case where oil is changed by prompting the driver to change oil when the amount of dilution water in oil becomes larger than the second threshold, the large amount of condensed water in oil can be swept out.

Besides, in the present embodiment of the disclosure, the driver is prompted to operate the internal combustion engine 1 when the amount of dilution water in oil becomes larger than the first threshold. Thus, the internal combustion engine 1 can be restrained from being stopped by the driver when the internal combustion engine 1 is in operation to evaporate the condensed water in oil. Thus, the evaporation of the condensed water in oil can be promoted when the operation of the internal combustion engine 1 is continued.

Besides, in the present embodiment of the disclosure, the amount of dilution water at the present moment can be calculated by calculating the increase/decrease value of the amount of dilution water in accordance with the operation state of the internal combustion engine 1 and adding the increase/decrease value to the amount of dilution water (the integrated value).

Besides, in the present embodiment of the disclosure, the amount of dilution water in oil can be appropriately calculated even when oil is changed, by resetting the amount of dilution water stored in the backup RAM 71d when oil is changed. That is, when oil is changed, the condensed water in the unchanged oil stored in the oil pan 13 is discharged together with the oil, and no condensed water is contained in the new oil poured afterward. Therefore, the amount of dilution water as to the new oil after oil change can be appropriately calculated by resetting the amount of dilution water in the backup RAM 71d.

Incidentally, the embodiment of the disclosure disclosed herein is exemplary in all the respects, and does not constitute any ground for limited interpretation. In consequence, the technical scope of the disclosure is not interpreted according only to the aforementioned embodiment thereof, but is defined by what is described in the claims. Besides, the technical scope of the disclosure encompasses all the alterations that are equivalent in significance and scope to the claims.

For example, in the present embodiment, a charge circuit (not shown) for charging the battery 72 through the use of an external electric power supply (not shown) may be provided. That is, the disclosure may be applied to a so-called plug-in hybrid vehicle.

Besides, in the present embodiment, the example in which the disclosure is applied to the hybrid vehicle 100 that is equipped with the motive power split mechanism 4 is presented, but the disclosure is not limited thereto. The control apparatus and the control method may be applied to a hybrid vehicle that is not provided with a motive power split mechanism, as long as the hybrid vehicle can run with an internal combustion engine in intermittent operation.

Besides, in the present embodiment, the example in which the internal combustion engine 1 is the port injection-type in-line four-cylinder gasoline engine is presented, but the disclosure is not limited thereto. It does not matter how many cylinders the internal combustion engine has. The internal combustion engine may be a V-engine or a horizontally opposed engine. Besides, the internal combustion engine may be an in-cylinder direct injection-type engine or another type of engine such as a diesel engine or the like.

Besides, in the present embodiment, a determination on the amount of dilution water in oil may be made using a dilution ratio as a degree of mixture of condensed water into oil.

Besides, in the present embodiment, the example in which the three parameters, namely, the engine rotational speed, the coolant temperature and the outside air temperature are used to calculate the increase/decrease value of the amount of dilution water is presented, but the disclosure is not limited thereto. Other parameters may be added to the three parameters, and the parameters may appropriately be combined to calculate the increase/decrease value of the amount of dilution water. Incidentally, as the other parameters, the amount of intake air, the amount of fuel injection, the timing of fuel injection, the timing of ignition and the like can be mentioned.

Besides, in the present embodiment, the example in which the internal combustion engine 1 is stopped at the time of the EV running mode is presented, but the disclosure is not limited thereto. When the amount of dilution water in oil is larger than the first threshold at the time of the EV running mode, a changeover from the EV running mode to the normal running mode may be made to start the internal combustion engine 1.

Besides, in the present embodiment, when the internal combustion engine 1 is in operation on the ground that the amount of dilution water in oil is larger than the first threshold, a shift to the EV running mode may be prohibited to prevent the internal combustion engine 1 from being stopped.

Besides, in the present embodiment, the example in which the internal combustion engine 1 is in operation when the amount of dilution water in oil is larger than the first threshold is presented, but the disclosure is not limited thereto. In the case where the amount of dilution water in oil is larger than the first threshold, the driver may be notified that the internal combustion engine 1 needs to be operated to evaporate the condensed water in oil, and the internal combustion engine 1 may be operated when the driver gives a permission.

Besides, in the present embodiment, the example in which the message promoting the operation of the internal combustion engine 1 is displayed when the amount of dilution water in oil is larger than the first threshold is presented, but the disclosure is not limited thereto. This message may not be displayed. In this case, the internal combustion engine may not be stopped from being operated.

Besides, in the present embodiment, the example in which the message prompting the driver to operate the internal combustion engine 1 and the message prompting the driver to change oil are displayed by the display 74a is presented, but the disclosure is not limited thereto. The driver may be notified of these messages (warnings), for example, acoustically.

Besides, in the present embodiment, the example in which it is determined, based on the detection result of the oil level sensor 86, whether or not oil has been changed is presented, but the disclosure is not limited thereto. It may be determined, based on a signal input from a maintenance tool (not shown), whether or not oil has been changed.

Besides, in the case where an operation portion (not shown) to be operated by a mechanic when oil has been changed is provided, it may be determined, based on a signal input from the operation portion, whether or not oil has been changed.

Besides, in the present embodiment, the example in which it is determined whether or not the amount of dilution water in oil is larger than the first threshold when the EV running condition is fulfilled is presented, but the disclosure is not limited thereto. The EV running condition may include a case where the amount of dilution water in oil is not larger than the first threshold. In this case, when the amount of dilution water in oil is larger than the first threshold, it is determined that the EV running condition is not fulfilled.

Besides, in the flowchart of the present embodiment, the example in which steps S10 to S13 are executed after the execution of steps S3 to S9 is presented, but the disclosure is not limited thereto. The order in which these steps are executed may be reversed. That is, the flowchart of the present embodiment of the disclosure is an example, and the disclosure is not limited to this procedure.

Besides, in the present embodiment, the ECU 71 may be constituted of a hybrid (HV) ECU, an engine ECU, a motor-generator (MG) ECU, a battery ECU and the like, and these ECU's may be connected to one another in a communicable manner.

The disclosure can be utilized in a control apparatus for a hybrid vehicle that controls the hybrid vehicle, which is equipped with an internal combustion engine and a motor that are configured to output a driving force for running, and which is configured to run with the internal combustion engine in intermittent operation.

What is claimed is:

1. A control apparatus for a hybrid vehicle including an internal combustion engine and a motor, the internal combustion engine being configured to output a driving force for running, and the motor being configured to output a driving force for running, the hybrid vehicle being configured to run with the internal combustion engine in intermittent operation,
the control apparatus comprising
an electronic control unit configured to:
calculate an amount of dilution water, the dilution water being water that is mixed into oil in the internal combustion engine to dilute the oil; and
operate the internal combustion engine when the amount of the dilution water becomes larger than a first threshold;
wherein the amount of dilution water is calculated by adding an increase/decrease value of the dilution water, and the increase/decrease value of the dilution water is calculated based on an engine rotational speed, a coolant temperature, an amount of intake air, an amount of fuel injection, and an outside air temperature.

2. The control apparatus according to claim 1, wherein the electronic control unit is configured to output a signal to prompt a driver to change the oil when the amount of the dilution water becomes larger than a second threshold, the second threshold is larger than the first threshold.

3. The control apparatus according to claim 1, wherein the electronic control unit is configured to output a signal to prompt a driver to continue to operate the internal combustion engine when the internal combustion engine is in operation in a case where the amount of the dilution water becomes larger than the first threshold.

4. The control apparatus according to claim 1, wherein the electronic control unit is configured to store the amount of the dilution water, and reset the amount of the dilution water stored in the electronic control unit when the oil is changed.

5. A control method for a hybrid vehicle including an internal combustion engine, a motor, and an electronic control unit, the internal combustion engine being configured to output a driving force for running, and the motor being configured to output a driving force for running, the hybrid vehicle being configured to run with the internal combustion engine in intermittent operation,
the control method comprising:
calculating an amount of dilution water by the electronic control unit, the dilution water being water that is mixed into oil in the internal combustion engine to dilute the oil, and
operating the internal combustion engine by the electronic control unit, when the amount of the dilution water becomes larger than a first threshold;
wherein the amount of dilution water is calculated by adding an increase/decrease value of the dilution water, and the increase/decrease value of the dilution water is calculated based on an engine rotational speed, a coolant temperature, an amount of intake air, an amount of fuel injection, and an outside air temperature.

* * * * *